United States Patent [19]

Rabowsky et al.

[11] Patent Number: 5,214,505

[45] Date of Patent: May 25, 1993

[54] AUTOMATIC RF EQUALIZATION IN PASSENGER AIRCRAFT VIDEO DISTRIBUTION SYSTEM

[75] Inventors: Irving Rabowsky, Woodland Hills; Richard E. Sklar, Huntington Beach, both of Calif.

[73] Assignee: Hughes Aircraft Company, Los Angeles, Calif.

[21] Appl. No.: 681,838

[22] Filed: Apr. 8, 1991

[51] Int. Cl.[5] .......................... H04N 7/10; H04H 1/02; H04B 17/00

[52] U.S. Cl. ...................................... 358/86; 455/3.1; 455/6.3; 455/67.4

[58] Field of Search ............................. 455/6.3, 8-10, 455/6.1, 6.2, 14, 3.1, 67.4; 358/86

[56] References Cited

U.S. PATENT DOCUMENTS

| | | | |
|---|---|---|---|
| 3,983,486 | 9/1976 | Rheinfelder | 455/14 |
| 4,395,780 | 7/1983 | Gohm et al. | 455/5.1 |
| 4,512,033 | 4/1985 | Schrock | 358/86 |
| 4,816,825 | 3/1989 | Chan et al. | 455/10 |
| 4,866,515 | 9/1989 | Tagawa et al. | 455/6.3 |
| 4,910,791 | 3/1990 | Dickinson et al. | 455/67.4 |

FOREIGN PATENT DOCUMENTS

0053390  3/1985  Japan ..................... 358/86

Primary Examiner—Reinhard J. Eisenzopf
Assistant Examiner—Nguyen Vo
Attorney, Agent, or Firm—Terje Gudmestad; Wanda K. Denson-Low

[57] ABSTRACT

A passenger aircraft video distribution system distributes modulated RF signals (lines 16,26) provided from a central signal source to be used at each passenger seat (208-1 through 208-15). The RF signals are distributed by means of various RF components, including amplifiers (14, 24, 34), taps and splitters (22, 30), positioned at different mutually distant stations (12, 18, 28), with at least some stations being interconnected by relatively long lengths of coaxial cable (16,26). In order to ensure proper RF levels for best tuner (36) operation and to compensate for different cable losses at different frequencies, one or more of the stations (18) in the distribution system is provided with a variable equalizer (23) controllable by a microprocessor (52). A separate service line (64,66) enables a central microprocessor (50) to monitor RF levels at different frequencies at at least one station (28) to automatically provide, via the same service line, appropriate equalization control signals to obtain proper compensation for the different cable losses at different frequencies. The monitored RF signals are also employed for diagnostic purposes.

20 Claims, 8 Drawing Sheets

AUTOMATIC RF EQUALIZATION IN PASSENGER AIRCRAFT VIDEO DISTRIBUTION SYSTEM

BACKGROUND OF THE INVENTION

1. Field of the Invention

The present invention relates to passenger aircraft video distribution systems, and more particularly concerns control of RF signal levels at different frequencies of such a system.

2. Description of Related Art

Each passenger of a passenger aircraft may be provided with an individually controllable electronics box unit to enable personal selection from among a group of different audio signals and a group of different video signals. The audio signals, and also the video signals, together with their own audio, are transmitted as entertainment signals to each of the passenger seats from one or more central audio and/or video sources. The various entertainment signals are modulated upon individual ones of a plurality of RF carriers of different frequencies and transmitted to the individual passenger seats via a series of transmission stations which are interconnected by lengths of coaxial cable. The stations are remotely positioned from one another so that the total length of cable between the video source and the passenger seat tuners may be in the order of one hundred to several hundred feet. At the various transmission stations the several signals are split into different groups for transmission to different areas of the aircraft, and signals are tapped for use at each individual passenger seat. It is essential in such a system to ensure that optimum RF input levels are provided to the video tuners at the individual passenger seat units. If the RF level at any seat unit is too low, the signal is weak, and video may be poor, exhibiting "snow". At least partly because each video signal from a number of video channels is modulated upon its own RF carrier, if the RF signal levels are too high, excessive intermodulation products may be generated which would be visible to the passengers using the video tuners.

In a co-pending application for Automatic RF Leveling in Passenger Aircraft Video Distribution System, filed Apr. 8, 1991, Ser. No. 07/681,850 and assigned to the assignee of the present application, there is described in detail a system for automatically controlling RF signal levels of the RF video carriers. However, control of RF signal level alone, equally over all carrier frequencies, is not sufficient in view of the relatively great lengths of cable through which the signal is transmitted from the video source to the passenger seat. Radio frequency signals in various frequency ranges, such as in the frequency range of between about 50 and 300 megahertz, are subject to frequency dependent losses (e.g. cable losses) in transmission of such signals through standard coaxial cable. Losses at higher frequencies are considerably greater than losses at lower frequencies. Accordingly, a plot of radio frequency or RF signal amplitude versus frequency at the output of a long cable exhibits a "tilt", showing a relatively higher amplitude at lower frequencies and a lower amplitude at higher frequencies because of the greater cable loss at the higher frequencies. Therefore, in order to obtain proper signal levels over all video channels, it is also necessary to provide proper equalization for the signals being fed to the passenger seat tuner to ensure proper RF levels at both high and low frequency channels and those in between.

One possible approach to handling this problem of ensuring proper "tilt" of the RF signal is to provide a fixed equalizer at some station upstream from the seats. For a system of a predetermined and fixed configuration such an approach may be satisfactory. However, this is not practical in the environment of a passenger aircraft because the aircraft configuration is frequently changed. Airlines often add or remove seats from one row or column, add additional channel capability by including additional sources of video channels at other frequencies, or otherwise reconfigure the entertainment distribution system. When such reconfiguration occurs and cable length is increased, video signals encounter additional cable loss, thereby changing the tilt at the end of the lengthened cable. Accordingly, if the aircraft system is reconfigured, the fixed equalizer must be changed to compensate for changed cable losses caused by changed cable length.

Another situation in which a fixed equalizer may be inadequate is the occurrence of a failure of an amplifier or other component. For example, if an amplifier in a system degrades in such a way that its output adds some unexpected tilt to the system, that is, should the amplifier degrade in such a way that it will amplify some frequencies more than others, it may be necessary to compensate by varying equalization to compensate for the changed tilt caused by the failed amplifier. The various electronic stations, which contain gain control amplifiers, are ordinarily not easily accessible, nor is there often an available technician who is sufficiently knowledgeable for adjusting and readjusting or replacement of equalizers in the system. Further, it is also desirable to report the nature and location of any failure or degradation of signals to a central location for diagnostic purposes. Present systems provide for no such diagnosis.

Accordingly, it is an object of the present invention to provide a multiple signal distribution system that avoids or minimizes above mentioned problems.

SUMMARY OF THE INVENTION

In carrying out principles of the present invention in accordance with a preferred embodiment thereof at least one station of a plurality of stations that are connected in a chain of stations by signal transmission media is provided with a variable equalizer. RF signal levels at a downstream station are monitored at at least a pair of separated frequencies, and the monitored levels are employed to vary the equalization provided at the variable equalizer of the upstream station so as to obtain a desired equalization at the downstream station.

DESCRIPTION OF THE PREFERRED EMBODIMENT

Figure 1:
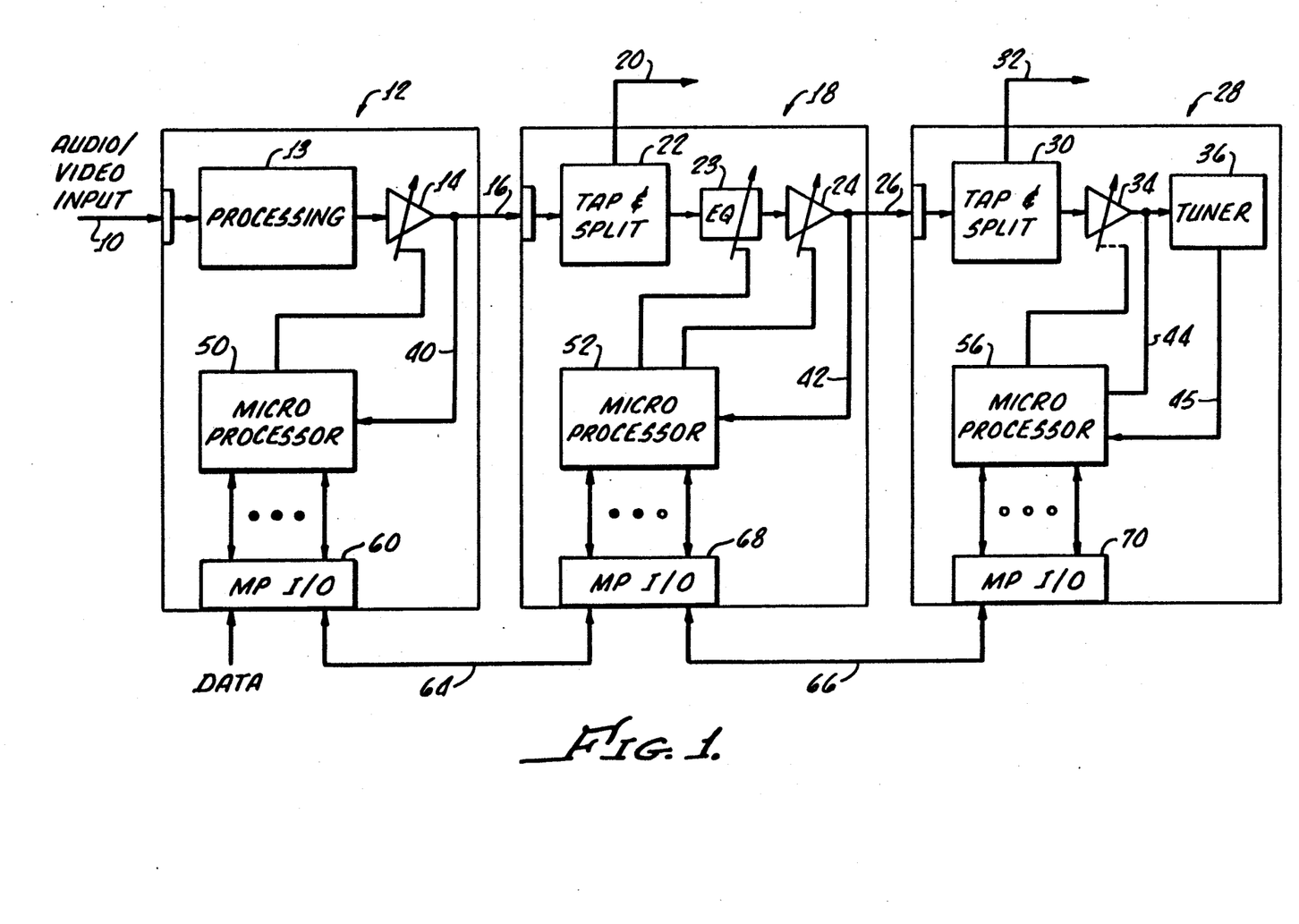
FIG. 1 is a greatly simplified block diagram showing several processing stations in a signal distribution system and the control of a variable equalizer at one of such stations.

In the very much simplified system illustrated in FIG. 1, a plurality of audio and video inputs on a line 10 from a plurality of input sources (not shown) are fed to a first station 12, which may be termed a "passenger entertainment service controller" (PESC) wherein signals are processed in processing circuitry 13 and fed through a variable gain amplifier 14. The amplifier has an output on a coaxial cable 16 which is fed as the input to the next downstream station 18, which may be, for example, an area distribution box (ADB). In the area distribution box the signal is transmitted via a line 20 to additional passenger seat boxes (ADB's). In addition, the signals are tapped in a tapping and splitting circuit 22 and then fed to a variable equalizer 23 from which the signals are fed to a variable gain amplifier 24. The output of variable amplifier 24, which comprises the signals fed to one branch of this entertainment system, are transmitted via a coaxial cable 26, and by means of one or more intermediate downstream stations (not shown in FIG. 1), to a video seat electronics box station (VSEB) 28 which is located at the passenger seat. Electronics box 28 includes a tapping and splitting circuit 30 that receives the transmitted signal on cable 26, splits the signal for transmission to further VSEB stations on a cable 32, and taps the signal to provide an input to a variable gain amplifier 34, which feeds the signals to an individual passenger tuner 36 at the passenger seat.

It is of importance to be able to readily control and adjust RF signal levels at various ones of the several stations of the system, and in particular to control both the level of the RF signals, equally for all RF carriers, and to compensate for cable losses at the input to the passenger seat tuner 36. The control of RF signal levels is performed as described in detail in the above-identified co-pending patent application for Automatic RF Leveling In Passenger Aircraft Video Distribution System, the disclosure of which is incorporated herein by this reference as though fully set forth.

In general, the system provides monitoring points on lines 40, 42 and 44 at the output of each of the amplifiers so that at each of these monitoring points a microprocessor monitoring signal may be obtained to provide a measurement of the level of the RF signal at the output of the respective amplifier. In addition, on a monitoring line 45 the tuner 36 provides a monitoring signal for monitoring of tilt of the signal at the tuner output. The monitoring signals may be manually and visually monitored in a suitable central display, and appropriate controlling signals computed and fed back to selected points, such as the individual variable gain amplifier gain control inputs to bring the several RF signal levels up to an appropriate level of value and, in addition, to control the input of the equalizer 23 at station 18 so as to vary the tilt (caused by frequency dependent RF level losses) at the passenger seat. Preferably the monitoring and controlling is done automatically by means of processors, such as microprocessors 50, 52 and 56, provided at each of the stations 12, 18, and 28 respectively. Microprocessor 50 in station 12 may be considered to be a master processor and receives, via microprocessor input/output circuit 60, a data base which is loaded into the system upon its initialization. This data base, which is loaded into each of the processors at the several stations, contains, among other things, information defining cable and seat column lengths, the number and types of the several stations, such as stations 12, 18 and 28, including all other items which affect the distribution of the video. The data base contains the number of VSCU's, PESC's, ADB's, VSEB's in each seat column, length of cable between each unit, desired RF levels at each amplifier output and acceptable range for two widely different frequencies, plus other items not related to the video distribution system. The information is sufficient to enable the microprocessor to compute the selected RF levels or may actually contain pre-computed RF levels for the variable gain amplifier at each station.

Importantly, the several stations communicate with one another by a separate communication cable or service path, which is independent of the RF coaxial cable forming the RF signal path lines 16 and 26. These service path lines are indicated in FIG. 1 as including cables 64, between stations 12 and 18, and cable 66, between stations 18 and 28. The service paths interconnect the microprocessor input/output circuits 68 at 70 at the various stations However, even though RF levels are monitored and automatically controlled to an optimum value, a reconfiguration of the system so as, for example, to add additional stations and additional cable, will result in a significant change in required equalization because the video carrier signals are so widely different in frequency. In an exemplary system, individual analog signals are modulated upon individual RF carriers, each at a specific frequency within the frequency range of about 50 megahertz to 300 megahertz. Thus, for example, channel 2 video may be modulated upon a 50 megahertz signal, whereas channel 47 video may be modulated upon a 300 megahertz carrier.

Figure 2:
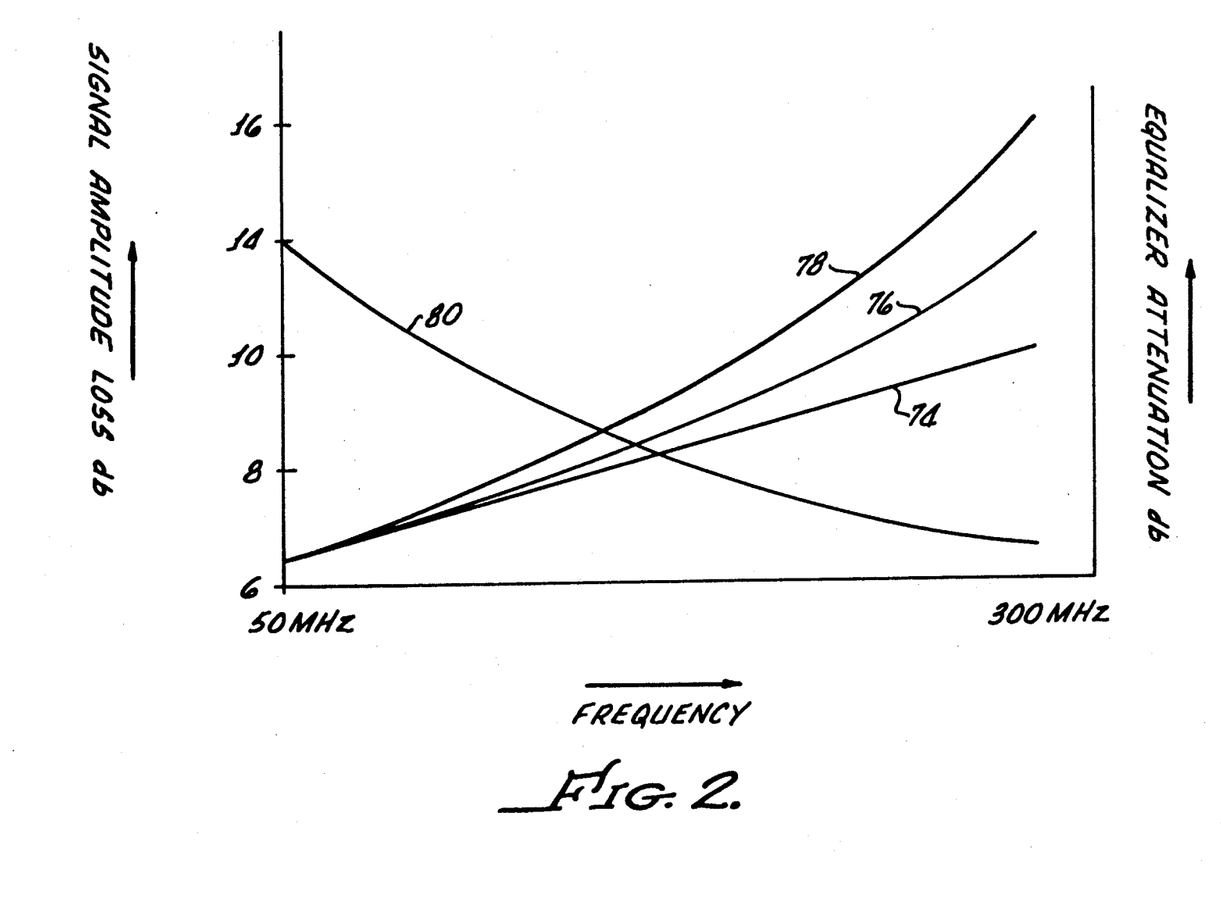
FIG. 2 is a plot showing variation of cable loss with frequency and also illustrating equalizer operation.

Illustrated in FIG. 2 are cable losses for different cable lengths over this frequency band. As can be seen in FIG. 2, a curve 74 depicts signal amplitude loss in decibels over the 50 to 300 megahertz band width, and, as an example, shows a loss of 10 decibels at 300 megahertz and a loss of 6.5 decibels at 50 megahertz for a cable of 140 feet in length.

Curve 76 illustrates signal loss for a longer cable, a cable of 200 feet in length, showing a loss of 14 decibels at 300 megahertz, whereas curve 78 corresponds to a cable of 300 feet in length, showing a loss of 16 decibels at 300 megahertz and a loss of 6.5 decibels at 50 megahertz.

Also shown in FIG. 2 is a desired equalizer attenuation curve 80 for the equalizer 23 at station 18. In effect the upstream equalizer provides a "reverse" equalization that compensates for frequency dependent cable losses that are manifested at the downstream stations. The equalizer, for example, provides frequency varying attenuation to compensate for total cable losses (both upstream and downstream of the equalizer) of the 200 foot long cable, of which losses are depicted by curve 76. Accordingly, if the known cable length is 200 feet, an equalizer would be used to provide attenuation indicated by curve 80, which would appropriately compensate for the frequency varying losses caused by curve 76. In effect a reverse tilt is provided by the equalizer so that at the end of the cable, at the passenger tuner, the tilt caused by cable losses has balanced the reverse tilt introduced by the equalizer. It will be seen that the compensation provided by curve 80 for the 200 foot cable of curve 76 is not adequate for cables of greater or lesser length, such as illustrated at curves 74 and 78. Accordingly, if the cable length is changed, the equalization should be changed, but this cannot be done readily in an aircraft environment with a fixed equalizer. Among other reasons, as mentioned above, properly qualified technicians are not readily available in the aircraft environment when the seat configuration is changed. Moreover, access to the electronic boxes may be difficult, or laborious and time consuming, so that remote and automatic equalization can provide much benefit.

Accordingly, as illustrated in FIG. 1 at station 18, the variable equalizer 23 is provided so that microprocessor 52, in addition to controlling the gain of variable amplifier 24 at this station, will also control the equalization provided by equalizer 23, in response to monitoring signals received from tuner 36 that indicate RF levels that collectively provide undesired tilt.

The tilt may be determined by monitoring the level at each of a pair of high and low limit or near limit frequencies (e.g. widely separated frequencies). As long as the RF level at the lowest frequency, such as channel 2, 50 megahertz, for example, is within a predetermined range of levels, and concomitantly the RF level of the signal at the highest carrier frequency, such as channel 47, 300 megahertz, for example, is within a predetermined range, the tilt is acceptable. If one or both of these signals is not within its pre-established range, the monitor signal provided on line 45 from tuner 36, and which is fed back to the master microprocessor 50, indicates an unacceptable tilt. Microprocessor 50 will send a signal out to the microprocessor 52 to cause the latter to vary the equalization provided from circuit 23 so as to bring the appropriate high or low signal back within the selected range.

In a presently preferred use of the variable equalization system described herein, equalization is monitored and adjusted at selected times. For example, it is presently preferred that equalization is carried out upon each initialization of the entertainment system. Effectively, the check-out of the passenger entertainment system, including the testing and adjustment of RF equalization, is accomplished as part of pre-flight procedures carried out immediately prior to each aircraft flight. Although it is not contemplated that the equalization adjustment would be employed during an aircraft flight, it is possible to accomplish such adjustment during a flight in the case of a passenger complaint, for example. Obviously, other times and intervals of equalization adjustment may be chosen.

To accomplish the equalization, the master microprocessor 50 at the master station sends a test RF carrier signal of the low carrier frequency, such as the channel 2 carrier for example, preferably without modulation (the video modulators are turned off), and at the same time commands the tuner at a selected seat to tune to the low frequency channel The VSEB microprocessor, such as microprocessor 56 at VSEB station 28 of FIG. 1, is connected so that the tuner can be operated remotely in response to a signal from the microprocessor and, of course, can be operated in response to control by the passenger at the seat. Thus with the tuner receiving the lower frequency RF carrier, the system compares the signal level at the tuner output on line 45 with the selected range of outputs for this low frequency carrier and stores this information. The system then transmits a high frequency test RF carrier, again preferably without modulation, and commands the same tuner to tune to the high frequency channel, such as channel 47, for example. The tuner output is compared with the range of RF levels with a predetermined range of RF levels for this channel. From this monitored information that indicates high and low frequency RF levels at the tuner output, the amount of actual tilt at the tuner is determined, and a suitable control or set of control signals is computed and generated for transmission to the RF equalizer 23 via its microprocessor 52.

Figure 3A:
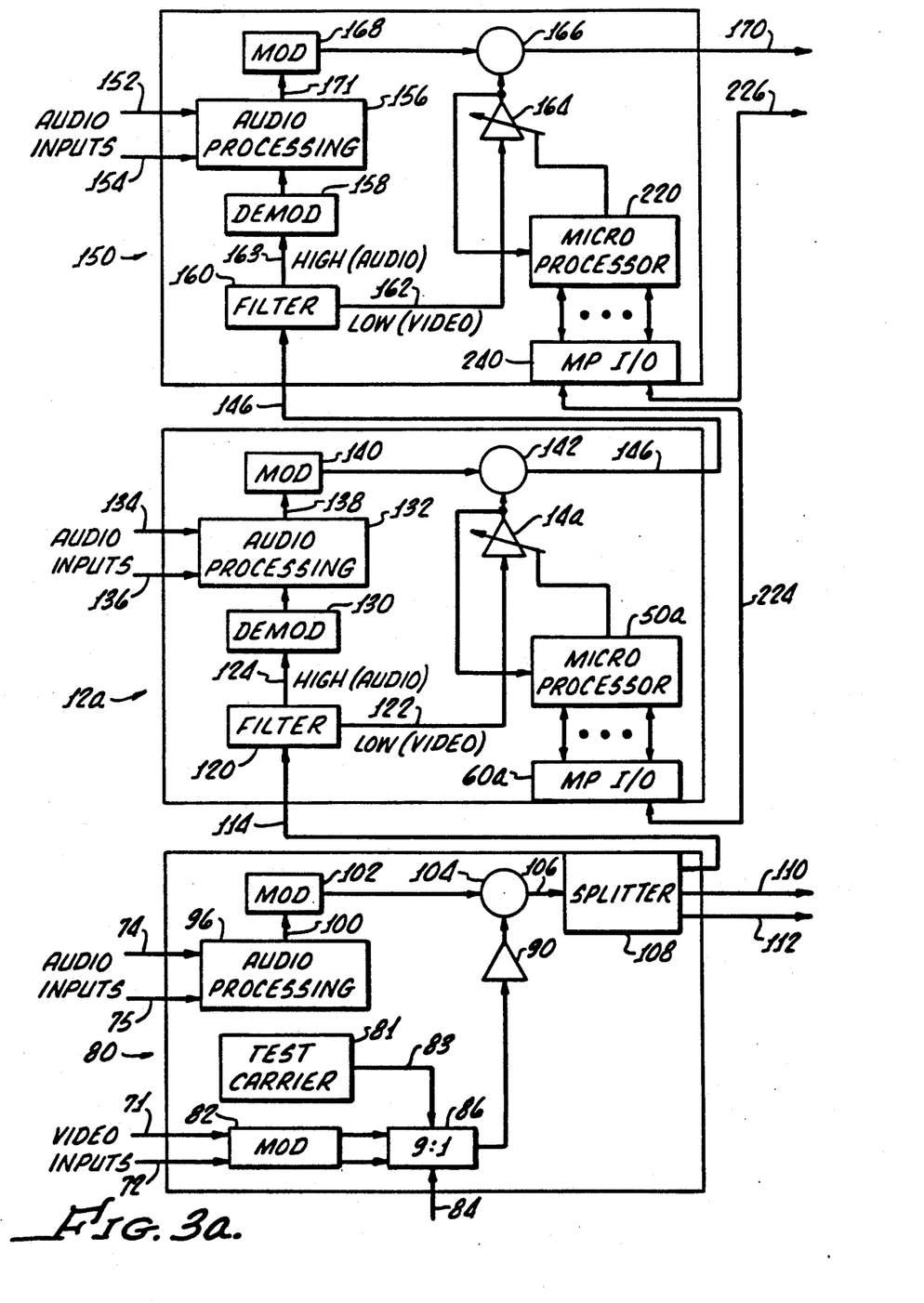
FIGS. 3a, 3b, 3c and 3d collectively comprise a more detailed block diagram of an exemplary passenger aircraft video distribution system embodying principles of the present invention.

Illustrated in FIGS. 3a, 3b, 3c and 3d collectively is a block diagram of an exemplary passenger entertainment system embodying principles of the present invention. These figures collectively illustrate a single system when placed side by side in order with FIG. 3a at the left. As illustrated in FIG. 3a, a number, such as 8 for example, of analog video signals are provided from a video source (not shown) as inputs on lines 71,72 to a first station 80 which may be termed a "video system control unit" (VSCU). The analog video inputs are each individually modulated in a separate one of a group of modulators, generally indicated at 82, to provide at the output of modulator 82 a number, such as 8 for example, of different frequency RF carriers having modulated thereon the analog video signals of 8 different video channels. A test carrier generator 81 is also provided to generate on a line 83 suitable high and low frequency test carriers. For a larger system there may be an additional video system control unit station identical to station 80 providing an output on a line 84, which is input to station 80. Such output of the additional VSCU comprises a group of RF carriers of different frequencies (each different than the RF carriers of station 80), and each having modulated thereon a unique channel of analog video information. The 8 modulated RF carriers on the 8 output lines of modulator 82, and the group of modulated RF carriers on input line 84, if there be such an input, and the test carrier, when the test carrier is generated, are combined in a circuit 86 that provides a single output including all of the different frequency RF carriers. This RF signal is fed to an amplifier 90. A group of audio inputs which may be, for example, a group of audio inputs on lines 74,75 are provided from an audio source (not shown), such as a CD, tape player, or the audio corresponding to the video sources 71,72, for example, and fed to an audio processing circuit 96, which samples and digitizes each of the audio analog signals and multiplexes all of the digitized audio samples to provide on a line 100 a serial bit stream comprising digital samples of each of the audio inputs in sequence. A more detailed description of the digitization of the audio inputs is found in a co-pending application of Kenneth A. Brady, Jr. and Richard E. Sklar for Daisy Chain Multiplexer, Ser. No. 630,713, filed Dec. 20, 1990, assigned to the assignee of the present application. The disclosure of this co-pending application is incorporated by this reference, as though fully set forth herein. The digital bit stream from audio processing circuit 96 is modulated in a modulator 102 and fed as a first input to a combiner 104, having as a second input the video modulated RF carriers at the output of amplifier 90. The audio signals are modulated in modulator 102 upon a carrier that is sufficiently high, having a frequency above the frequencies of the video modulated RF carriers, so that amplifiers and other signal transmission components of reasonably available band width may be employed. Thus, for example, the video modulated RF carriers may occupy a frequency band between about 50 and 300 megahertz, whereas the RF carrier upon which is modulated the digitized audio in modulator 102 may have a frequency in the order of about 360 megahertz. However, the use of audio signals is not needed for the practice of the invention described herein. The several video and audio modulated RF carriers appear combined on a line 106 and are fed to a splitter 108, which provides coaxial output cables 110 and 112 to a pair of tapping units (not shown) for use of the video signals in other non-personal operations, such as the common aircraft cabin overhead projection system, for example.

The individual passenger entertainment signal is provided from the output of splitter 108 on a coaxial cable 114 to the input of a passenger entertainment service controller station 12a, which corresponds to station 12 of the simplified block diagram of FIG. 1. The modulated RF signal on cable 114 is fed to a filter 120 in station 12a, which separates the relatively lower frequency or video carriers from the higher frequency audio modulated carrier. The audio appears on line 124, and the video on line 122 from filter 120. The audio modulated carrier is demodulated in a demodulator 130 to provide demodulated digitized audio samples that are fed to audio processing circuitry 132 which may also receive local audio analog inputs on input lines generally indicated at 134, 136. The local audio analog inputs are digitized and combined in a single serial bit stream with the digitized audio samples from demodulator 130 and fed on a line 138 to a modulator 140 which modulates this combined bit stream upon an RF audio carrier having the relatively higher 360 megahertz frequency previously described.

Modulated audio is fed as a first input to a combiner 142 which has as its second input the output of a variable gain amplifier 14a (corresponding to amplifier 14 of FIG. 1) which in turn receives the signals on line 122, comprising the video modulated RF carriers. The modulated RF carriers from the output of combiner 142 are fed via a coaxial cable 146 to a second passenger entertainment service controller 150, which may ba identical to the passenger entertainment service controller 12a. A second controller station 150, substantially the same as 15 controller station 12a, is employed to enable use of an additional group of audio inputs, indicated as being provided on lines 152, 154, to an audio processing circuit 156. The latter receives the output cf a demodulator 158 at the input of which is received the high frequency audio modulated RF carrier from a high/low filter 160. The latter receives the video and audio modulated carriers on coaxial cable 146 and provides the low frequency video modulated carriers on a video line 162, and a higher frequency audio modulated carrier on a second output line 163. The video modulated carriers are fed to the input of amplifier 164, which provides one input to a combiner 166. The other input to combiner 166 is provided from a modulator 168 receiving the digitized audio samples in the form of a serial bit stream on a line 171 and including in sequence the digital audio samples from audio inputs on lines 74 and 75 of station 80, audio inputs on lines 134 and 136 from station 12a, and the local audio inputs on lines 152, 154 of station 150. A coaxial cable output 170 of combiner 166, feeds to a first one of a group of four area distribution boxes (ADB's) 172, 174, 176, and 178 (FIG. 3b), and, more specifically, to a variable gain amplifier 24a of area distribution box 172. The output of variable gain amplifier 24a is fed through a coupler 180 and thence in series to area distribution boxes 174, 176 and 178, each of which is identical to area distribution box 172. The audio and video modulated RF carriers are tapped from coupler 180 into a variable gain equalizer 23a (corresponding to equalizer 23 of FIG. 1) and a variable gain amplifier 24b, which in turn feeds to a splitter 182. Amplifiers 24a and 24b collectively correspond to amplifier 24 of the simplified block diagram of FIG. The system of claim 16 wherein said.

Figure 3B:
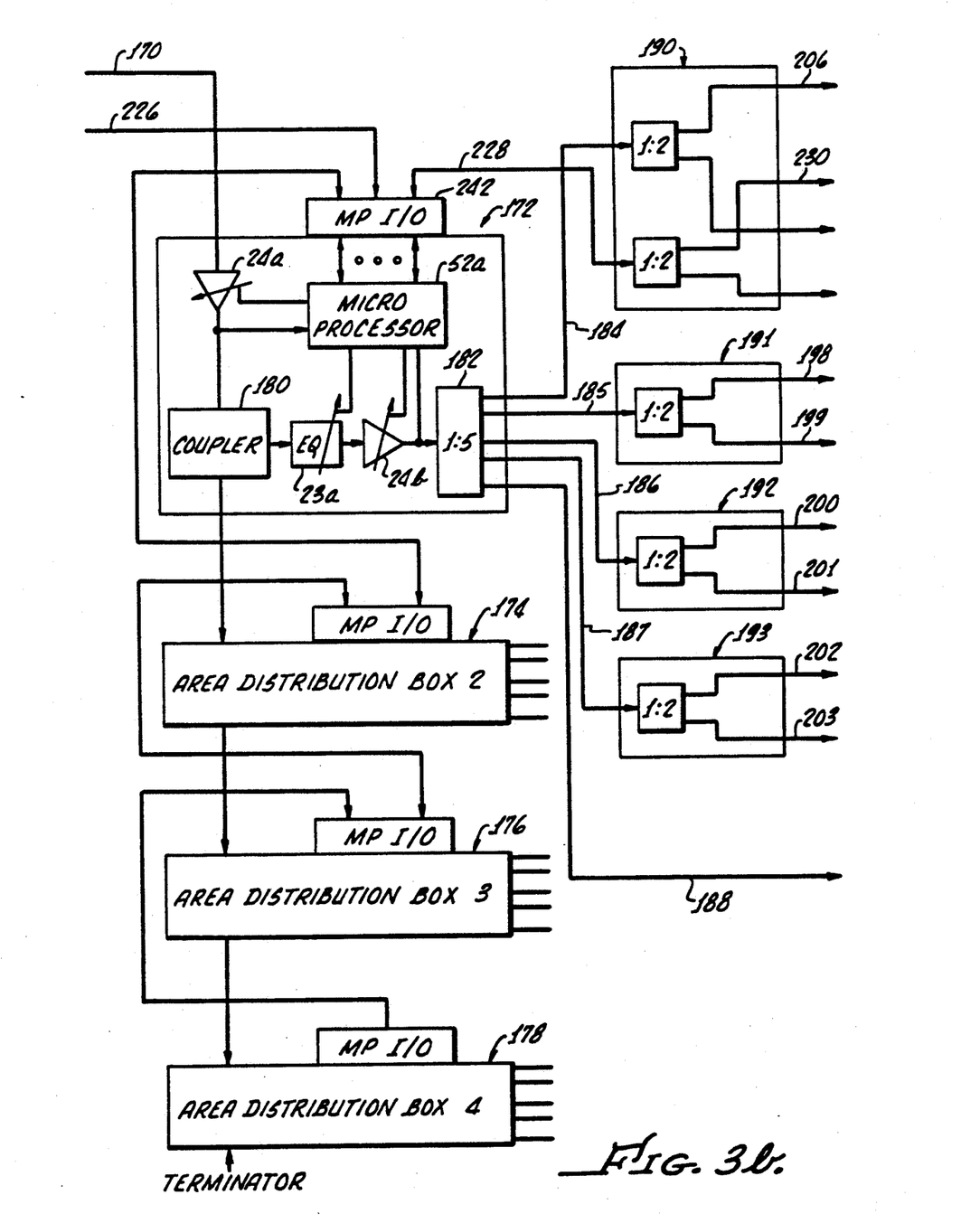

Area distribution box 172, via coaxial cables 184, 185, 186, 187 and 188, feeds stations cf a group of similar stations designated as floor disconnect boxes (FDB's) 190, 191, 192, and 193, in addition to feeding directly to a line of stations denoted as video seat electronic box stations (VSEB's) 194-1 through 194-5, including 194-2. Each of the video seat electronic box stations 194-1 through 194-6 feeds a pair of tuners, each of which is individual to a single seat.

Each of the floor distribution boxes, stations 191, 192 and 193 feeds via a pair of output lines 198, 199, 200, 201, 202 and 203, respectively, to two lines of 15 video seat electronic box stations each, each line feeding to individual tuners at the passenger seats.

Figure 3C:
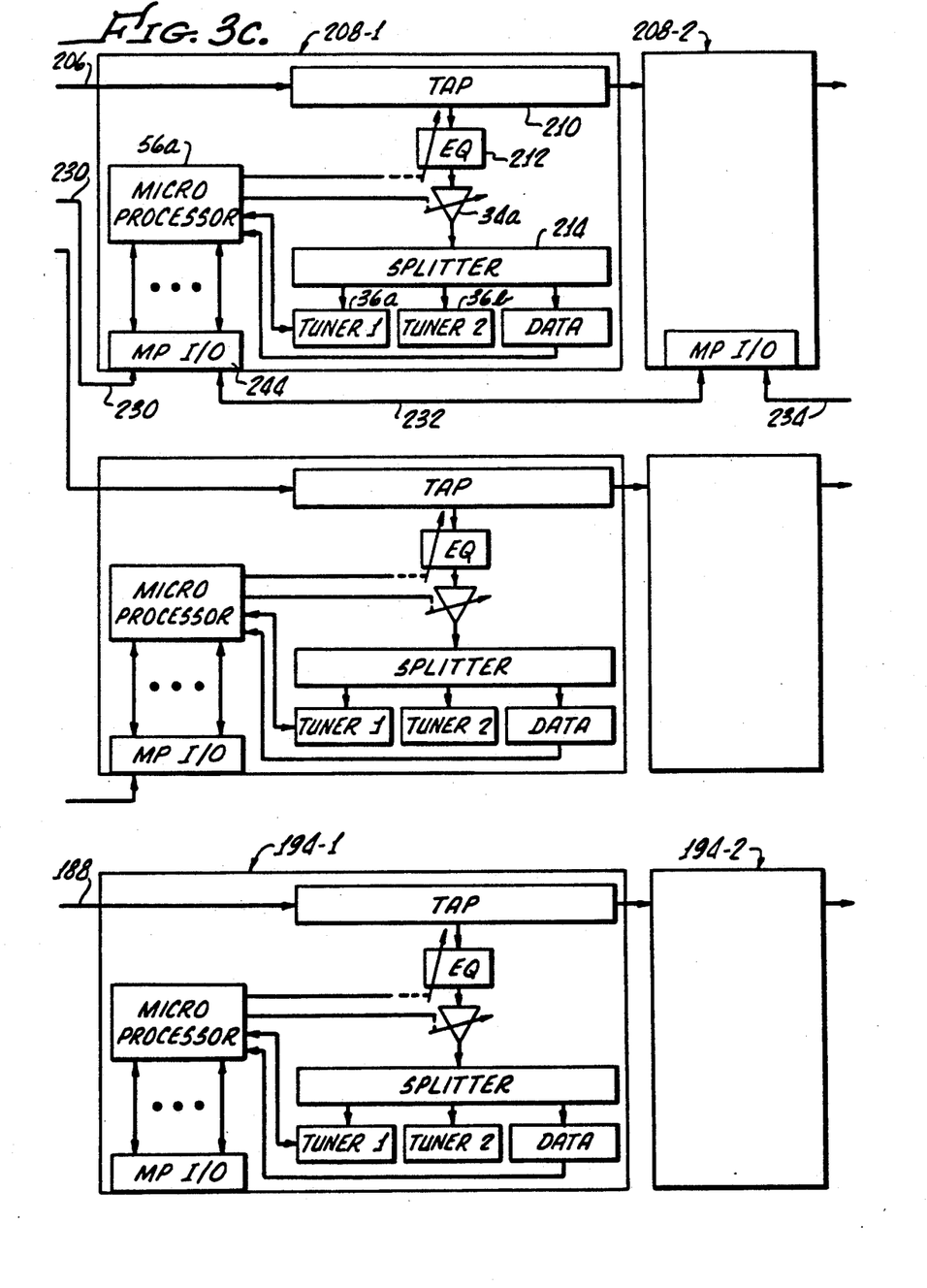
Figure 3D:
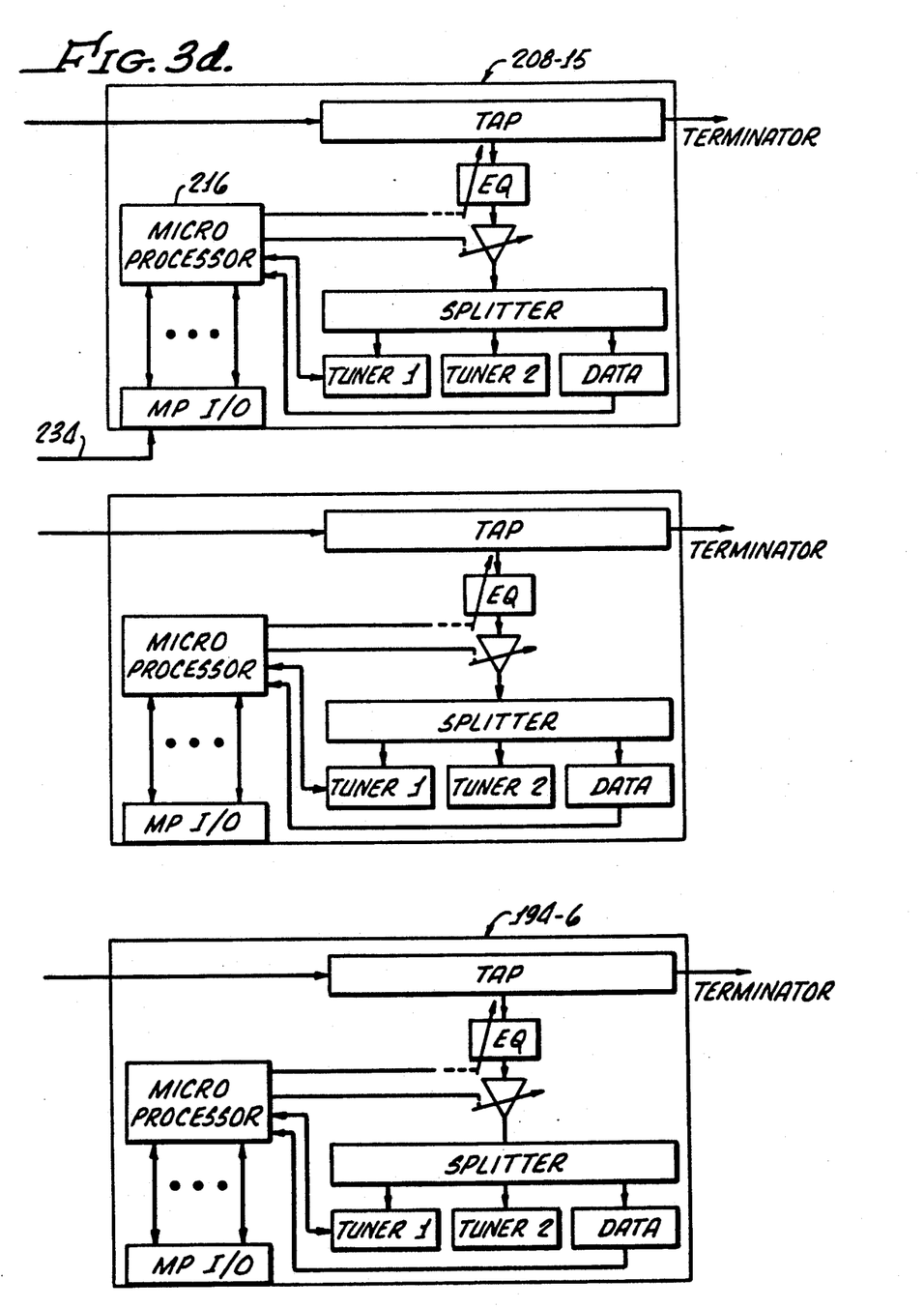

Similarly, floor distribution box 190 feeds, via a coaxial cable 206, a video seat electronic box station 208-1, which is the first in a line of 15 video seat electronic box stations of which, additionally, only the second, that indicated at 208-2, and fifteenth, that indicated at 208-15, are shown in FIGS. 3c and 3d. Each video seat electronic box includes a circuit 210 that transmits the video and audio modulated RF on down the line of video seat electronic box stations, and, in addition, taps off the signals for local use via a variable equalizer 212 and a variable gain amplifier 34a (corresponding to amplifier 34 of FIG. 1). The equalizer 212 at the VSEB is illustrated as an optional device, used only where equalization provided by equalizer 23a at the ADB station may be unable to compensate fully for RF level tilt. Thus no equalizer corresponding to equalizer 212 is shown in FIG. 1. The output of amplifier 34a feeds to a splitter 214, which in turn feeds a first tuner 36a and a second tuner 36b, each of which is individual to an individual passenger. Each of the video seat electronic boxes of each of the lines of video seat electronic boxes is identical to all of the others, excepting only that, in the exemplary embodiment disclosed herein, the last line of video seat electronic boxes (194-1 through 194-6) is only six in number, whereas all of the others are 15 in number. However, it will be readily understood that any one or more of the lines of video seat electronic boxes may have more or fewer stations as determined by the desired aircraft configuration. Further, individual equalizers may not be necessary for each VSEB station so that the number and locations of variable equalizers in addition to equalizer 23a may be varied as deemed necessary or desirable.

As an example of the physical arrangement of the system and lengths of cables employed, coaxial cable lengths in a typical system may be ten feet between stations 80 and 12a, fifty feet between stations 12a and 150, thirty-three feet between stations 150 and 172, thirty to forty feet between each of the successive area distribution box stations 172, 174, 176 and 178, thirty-three feet between the area distribution box station 172 and each of the floor disconnect stations 190,191, 192 and 193, and seven feet between the floor distribution box station 190 and the next VSEB. A cable length of seven feet connects each pair of adjacent ones of the VSEB's in a single line serviced by the one floor distribution box 190. Each ADB station has its own variable equalizer 23a because the cable length to the lines of VSEB stations are so different for the VSEB lines served by each ADB station. Thus it can be seen that reconfiguration may cause significant changes in cable length, thereby causing changes in signal levels and RF tilt due to changes in the transmission loss through the cable.

Each video seat electronic box station includes a microprocessor, such as microprocessors 56a (corresponding to microprocessor 56 of the simplified arrangement of FIG. 1) and microprocessor 216 of video seat electronic box 208-15. The floor distribution box stations have no microprocessors nor amplification, but each area distribution disconnect box includes a microprocessor, such as microprocessor 52a of station 172, and equivalent microprocessors and variable equalizers (not illustrated in the drawings) in each of ADB stations 174, 176 and 178. Each of the passenger entertainment service controller stations 150 and 12a includes its own microprocessor, such as microprocessor 220 for station 150 and microprocessor 50a (corresponding to microprocessor 50 of FIG. 1) for station 12a.

The separate service line illustrated in FIGS. 3a, 3b, 3c and 3d is shown to include line 224 from station 12a to station 150 line 226 from station 15C to the first area distribution box station 172, line 228 from station 172 to floor disconnect box 190, and connecting cables 230, 232 and 234 interconnecting the several video seat electronic box stations 208-1 through 208-15. Similar service cables interconnect each video seat electronics box station with its adjacent VSEB and its associated floor distribution box station for all stations served by each floor distribution box. Further, the independent service cable path has legs interconnecting each of the area distribution box stations 172, 174, 176 and 178, all to enable servicing and communication paths independent of the signal transmission path. The interconnections of the several service lines are accomplished through the microprocessor input/output logic that is provided at each station having a microprocessor, such as, for example, the input/output circuits 60a, 240, 242 and 244 of stations 12a, 150, 172 and 208-1 respectively.

Figure 4:
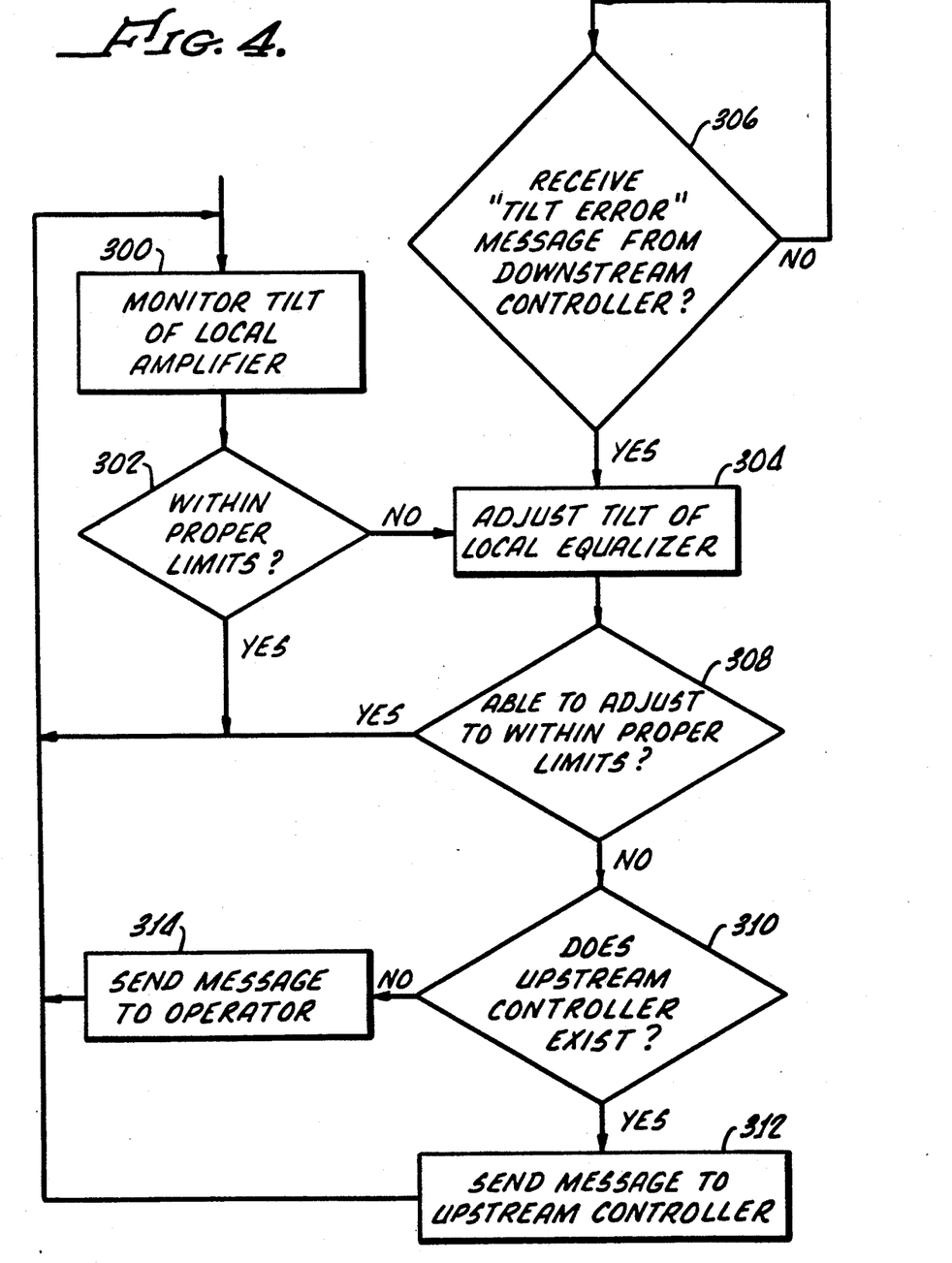
FIG. 4 is a flow chart of a program control of a variable equalizer.

Illustrated in FIG. 4 is a flow chart of a program for decision making logic to be carried out at the master microprocessor 50a for commanding adjustment of equalizer 23a in response to signal levels at high and low frequency channel outputs of tuner 36a of VSEB station 208-1.

Tilt is monitored at an individual seat tuner, as previously described, and as indicated in block 300 of the flow chart. If the tilt is within the proper limits, the program returns to the monitoring of the tilt. If the tilt is not within the proper limits a command is sent to the local equalizer to adjust its equalization, as indicated in block 304. Such a command to adjust tilt of local equalization is also sent if the local station receives a tilt error message from a controller that is downstream of the local station, as indicated in decision block 306. The amount of required equalization is then compared to the capability of the local equalizer to determine if the latter is able to adjust equalization with the proper limits, as indicated in decision block 308. If the required adjustment is within the capability of the local equalizer, the system performs the adjustment and returns to the monitoring of tilt. If the system is unable to perform the adjustment at the local equalizer, a determination is made as to whether or not an upstream controller with an adjustable equalizer exists, as indicated in decision block 310. In such an upstream controller and variable equalizer exists, then an appropriate message is sent to such upstream controller, as indicated in block 312. If such an upstream controller and equalizer do not exist, an appropriate message is then sent to the operator indicating that adequate tilt adjustment cannot be made, as indicated in block 314.

Figure 5:
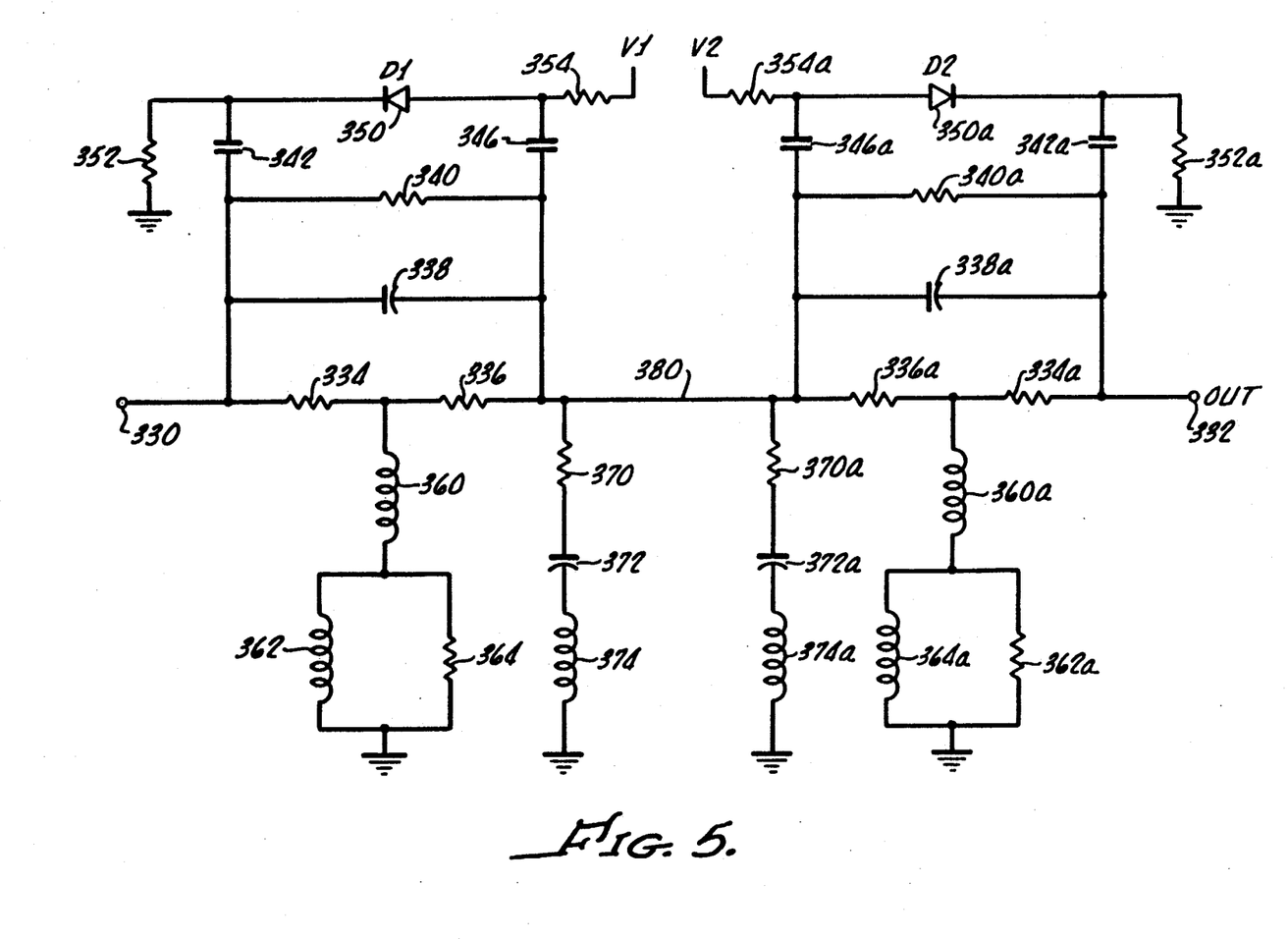
FIG. 5 is a circuit diagram of a variable gain equalizer.

A typical variable gain equalizer for use in the described system, which may be used as equalizer 23a or 212 of FIGS. 3b and 3c is illustrated in FIG. 5.

The variable equalizer is comprised to two bridged "T" attenuator circuits in cascade, two series tuned circuits inserted between the two attenuators, and PIN diodes inserted across each of the bridges of the bridged "T" attenuator. The pair of bridge "T" attenuators includes an input terminal 330 and an output terminal 332, with the first of the attenuator circuits including a pair of series connected resistors 334,336 connected in parallel with a capacitor 338 and in parallel with a third resistor 340. Connected in parallel with resistor 340 are a pair of capacitors 342,346 between which is connected a pin diode 350. The junction of the cathode of the diode and capacitor 342 is connected to ground by a resistor 352. The junction of the diode anode and capacitor 346 is connected via a resistor 354 to a variable voltage source $V_1$ for providing a variable bias to the diode.

Connected between the resistors 334 and 336, by means of an inductance 360, is a parallel tuned circuit in parallel to ground. The second of the two bridged attenuator circuits is identical to the first and includes a pair of resistors 334a, 336a, capacitor 338a, resistor 340a, additional capacitors 342a,346a, grounded resistor 352a, PIN diode 350a, and input control resistor 354a connected to a variable voltage source $V_2$. A parallel tuned circuit comprising inductance 364a and resistor 362a is connected between ground and the junction of resistors 334a and 336a by means of an inductance 360a.

Each of the two bridged "T" attenuators uses the illustrated resistance, inductance and capacitance elements to define amplitude versus frequency response (the slope) characteristic of the circuit. The two bridged "T" attenuators may have identical circuitry or may be different, depending on the range of adjustment required for each attenuator.

Each bridged "T" attenuator circuit includes a series tuned circuit inserted in parallel with the attenuator, comprising, respectively, resistors 370,370a, capacitors 372,372a, and inductances 374,374a, all connected in series between ground and the line 380 connecting the two bridged "T" attenuator circuits.

The series tuned circuits are inserted in parallel with the attenuators. The resistor in the series resonant circuit controls the Q factor of the circuit, and the inductance and capacitance values control the resonant frequency. The circuits are employed to fine tune the frequency response characteristic of the equalizer to a predetermined characteristic.

The PIN diodes are each placed in parallel with each bridged "T" attenuator, and the control circuitry, including resistors 354 and 354a and the resistors 352 and 352a, are provided to allow each diode to be biased independently. The diodes, of course, are adjustably biased by the selectively variable voltages provided from sources $V_1$ and $V_2$ through input resistors 354 and 354a.

With no bias the diodes are turned off and provide high resistance to an RF signal. Thus the equalizer performance is essentially unaffected by the presence of the diode. As each diode is biased to provide more and more conduction the diode resistance drops and more and more of the signal goes through the diode, bypassing the bridged "T" attenuator circuit. At maximum conduction of the diode, essentially all of the RF signal flows through the diode, effectively entirely bypassing the attenuator. The circuitry provides the ability to bypass each diode independently or together, resulting in the ability to adjust the slope of the variable equalizer over a wide range merely by adjusting one or both of $V_1$ and $V_2$.

The use of a single equalizer, such as variable equalizer 23a (FIG. 3b), without any other variable equalizers at other stations, will provide tilt compensation that is adequate for most situations. The equalization is based upon monitoring of signal levels at a particular one of the VSEB stations. It will be understood, of course, that monitoring, for control and adjustment of a single equalizer, may be carried out at one or more of the VSEB stations so that a worst case situation of excessive tilt (e.g. that seat with the worst tilt) may be selected for use in adjusting equalization provided by the equalizer 23a. As previously mentioned, the RF level of each video carrier (at the video carrier upper and lower band limits) will provide satisfactory signals, without excessive tilt, as long as each level is within a predetermined range of levels. Accordingly, if the level at a monitoring point is only marginally outside of the predetermined range, an adjustment of the equalization may be carried out to bring such monitored inadequate level back into the predetermined range. Because the equalizer is connected to control equalization for more than one line of VSEB stations, the adjustment of equalization to correct for excessive tilt at one VSEB station will also change the tilt at all of the other stations serviced by the one equalizer. However, the tilt adjustment may be sufficiently small so that RF levels at all stations still may remain within the selected ranges. Moreover, it may be determined that tilt at one VSEB station is so bad that some adjustment is desired even though other stations are moved slightly out of adjustment. Such a situation could exist during a flight, for example, so that a temporary "emergency" alleviation of a major tilt problem is achieved at the cost of causing a slight tilt problem at other VSEB stations. The monitoring, via the test carriers, provides information concerning tilt problems so that a more permanent fix may be made at a more convenient time and location.

What is claimed is:

1. A multiple frequency signal transmission system comprising:
    a plurality of stations connected by a transmission medium for transmitting information signals having a predetermined band of frequencies and test signals of first and second different frequencies from one station to the next, said stations being spaced apart from one another,
    means at each of a group of said stations for processing the information signals transmitted thereto,
    means at a first relatively downstream one of said stations of said group for monitoring said test signals transmitted thereto to monitor frequency dependent signal loss of signals received at said downstream station, and
    means at a second station of said group upstream from said relatively downstream station and responsive to said monitored signals for equalizing the information signals transmitted there through over said predetermined frequency band so as to compensate for frequency dependent signal losses at said downstream station.

2. The system of claim 1 wherein said means for equalizing comprises a variable equalizer at said relatively upstream station.

3. The system of claim 1 wherein said means for equalizing comprises a variable equalizer at said relatively upstream station having an output, and a variable gain amplifier connected to amplify the output of said equalizer.

4. The system of claim 1 wherein said means for equalizing includes a service line independent of said signal transmission medium through said stations of said group.

5. The system of claim 1 wherein said transmission medium comprises a signal transmission line from one station to the next and wherein said means for monitoring and said means for equalizing comprise a service line independent of said signal transmission line.

6. A method of compensating for frequency dependent transmission losses of signal level in a downstream station of a group of stations that are connected in a chain of stations by a signal transmission line, and wherein each of a group of said stations is located at a distance from an adjacent station, said method of compensating comprising the steps of:
    monitoring frequency dependent variations in received signal level of first and second test signals of different frequencies received at a relatively downstream one of said stations of said group of stations, and employing said monitored signal levels to adjust the signal level at a station of said group that is upstream with respect to said downstream station in response to monitored signal levels at said downstream station so as to decrease said frequency dependent variation at said downstream station.

7. The method of claim 6 wherein step of monitoring variation in signal level comprises sensing said received signal level at each of a first frequency and a second frequency at said downstream station.

8. The method of claim 6 wherein said step of monitoring variations in signal level comprises sensing a signal level at a given frequency at a downstream one of said stations, which signal level is outside of a predetermined range of levels, and wherein said step of employing said signal levels to adjust comprises adjusting equalization of the signal at a station that is upstream from said downstream station to bring the sensed signal at said downstream station within said predetermined range of levels.

9. The method of claim 6 Wherein at least said monitoring step comprises employing a service line that is separate from and independent of said signal transmission line.

10. A signal transmission system comprising:
    first and second mutually displaced signal stations,
    a signal transmission line for transmitting a signal from said first station to said second station,
    said transmission line introducing frequency related transmission losses that are greater at higher frequencies than at lower frequencies,
    means at said first station for receiving an input signal to be transmitted to said second station, means at said second station for utilizing the signal transmitted from said first station, said second station including monitoring means for providing an indication of frequency related losses of said signal received at said second station, and means at said first station responsive to said monitoring means at said second station for adjusting the signal transmitted from said first station so as to compensate for the frequency related losses of signal received at said second station.

11. The system of claim 10 wherein said signal comprises a broad band signal and said monitoring means comprise means for monitoring levels of signals of first and second frequencies received at said second station.

12. A signal transmission system comprising:

first and second mutually displaced signal stations, a signal transmission line for transmitting a signal from said first station to said second station, said transmission line introducing frequency related transmission losses that are greater at higher frequencies than at lower frequencies, means at said first station for receiving an input signal to be transmitted to said second station, means at said second station for utilizing the signal transmitted from said first station, said second station including monitoring means for providing an indication of frequency related losses of said signal received at said second station, means at said first station responsive to said monitoring means at said second station for adjusting the signal transmitted from said first station so as to compensate for the frequency related losses of said signal received at said second station, test means for generating first and second test signals, each having a different frequency, said monitoring means including means for transmitting said test signals from said first station through said transmission line to said second station, and said monitoring means including means for monitoring levels of said first and second test signal at said second station.

13. The system of claim 12 wherein said means at said second station for utilizing said signal comprises a tuner responsive to said signal for selecting a predetermined frequency component of said signal.

14. The system of claim 13 including a microprocessor connected to said tuner for controlling said tuner to select said first and second test signals, and means at said first station for controlling the microprocessor.

15. A passenger aircraft video distribution system comprising:

a passenger entertainment service controller (PESC) station having video inputs and including means for providing an output comprising a plurality of different frequency RF carriers having video signals modulated thereon, an area distribution box (ADB) station having a variable equalizer connected to receive the output of said PESC station and providing an ADB output, a string of interconnected video seat electronic box (VSEB) stations, each having at least one tuner for manual operation by a passenger at said VSEB stations, said tuner having an output, coaxial cable means interconnecting said PESC station, said ADB station and said VSEB stations, said cable means introducing tilt in levels of the output of said tuner, means at said VSEB stations for monitoring levels of the output of said tuner at two different frequencies, and control means responsive to said monitored outputs of said tuners for adjusting said variable equalizer to decrease said tilt.

16. A passenger aircraft video distribution system comprising:

a passenger entertainment service controller (PESC) having video inputs and providing an output comprising a plurality of RF carriers having video signals modulated thereon, an area distribution box (ADB) having a first ADB variable gain amplifier connected to receive the output of said PESC station, said ADB station comprising:

a coupler responsive to said first ADB amplifier and providing a first output, a variable equalizer connected to receive a signal from said coupler and to provide an equalized output, a second ADB variable gain amplifier connected to receive said equalized output and to provide an ADB output signal comprising said carrier having video signals modulated thereon, and wherein said carrier are provided with a reverse equalization, a line of interconnected video seat electronic box (VSEB) stations, each having at least one tuner for manual operation by a passenger at said VSEB stations, each of a group of said VSEB stations including a tap responsive to said ADB output and providing a modulated RF carrier output to the next VSEB station in said line of VSEB stations, each said VSEB station of said group including a tuner connected to its tap, at least one of the tuners of some of said VSEB stations including a monitoring terminal for providing a monitoring signal indicative of RF signal levels at two different frequencies at such one tuner, and means responsive to the monitoring terminal at said one tuner for controlling said variable equalizer at said ADB station to thereby compensate for the frequency dependent loss of signal level at the output of said one tuner, said PESC, ADB and VSEB stations each being mutually displaced from one another and interconnected by radio frequency transmission cable.

17. The system of claim 16 wherein said means responsive to the monitoring terminal for controlling said equalizer includes a service line separate from and independent of said transmission cable.

18. The system of claim 16 wherein said means for controlling said equalizer comprises means for transmitting first and second test signals having different frequencies to said PESC station for transmission to said one VSEB station.

19. The system of claim 16 wherein said step of monitoring comprises transmitting said first and second test signals of different frequencies to said downstream station, detecting levels of said test signals at said downstream station, and comparing said detected levels to predetermined ranges of signal levels.

20. The signal transmission system of claim 10 including test means for transmitting through said transmission line to said second station first and second test signals having respectively different frequencies, said monitoring means including means for detecting levels of said first and second test signals at said second station, and means for comparing said detected levels to predetermined ranges of signals levels.

* * * * *